United States Patent [19]

Hayashi et al.

[11] 4,041,193

[45] Aug. 9, 1977

[54] METHOD FOR FANNING EACH SET OF MULTI-PLY SHEETS

[75] Inventors: Takao Hayashi; Hiroharu Matsukawa, both of Fujimiya, Japan

[73] Assignee: Fuji Photo Film Co., Ltd., Minami-ashigara, Japan

[21] Appl. No.: 519,734

[22] Filed: Oct. 31, 1974

[30] Foreign Application Priority Data

Oct. 31, 1973 Japan ............................ 48-122542
Oct. 31, 1973 Japan ............................ 48-122543

[51] Int. Cl.² .................................................. B41M 5/00
[52] U.S. Cl. ................................ 427/151; 427/207 R; 427/331

[58] Field of Search ............... 427/207, 300, 285, 331, 427/151

[56] References Cited

FOREIGN PATENT DOCUMENTS 7,138    1913    United Kingdom

Primary Examiner—Bernard D. Pianalto
Attorney, Agent, or Firm—Sughrue, Rothwell, Mion, Zinn and Macpeak

[57] ABSTRACT

A method for fanning multi-ply sheets into units thereof, which comprises applying the adhesive composition to one side of a stack of multi-ply sheets, e.g., pressure-sensitive copying sheet units, and separating each unit of the sheets.

8 Claims, No Drawings

METHOD FOR FANNING EACH SET OF MULTI-PLY SHEETS

BACKGROUND OF THE INVENTION

1. Field of the Invention

The present invention relates to a method for fanning multi-ply sheets and an adhesive composition therefor.

2. Description of the Prior Art

Japanese Pat. Publication No. 3569/71, Japanese Pat. Publication Nos. 40464/1973, 7634/1975, etc., describe in detail methods for fanning the sheets of each set of multi-ply sheets of, e.g., pressure-sensitive copying papers (described in, e.g., U.S. Pat. Nos. 2,711,375; 2,712,507; 2,730,456; 2,730,457; 3,418,250; 3,432,327; etc.) and an adhesive composition therefor.

According to the prior art, gelatin, gelatin derivatives, gelatin degradation products, or a mixture thereof with an aqueous emulsion of resin (i.e., high polymer latex) are used as an adhesive component.

However, gelatins tend to decompose and undergo great changes in viscosity depending upon the temperature. Therefore, adhesives containing gelatins have failed to attain the desired characteristics with respect to storability, adhesiveness and separability. (The term "separability" designates the ease in fanning the sheets of each set. When fanning can be effected well, the separability is said to be good, whereas when fanning is difficult, separability is said to be poor.) Further, since latexes added for the purpose of increasing the adhesiveness lack separability, even such an adhesive has been desired to be improved as a commercial product.

SUMMARY OF THE INVENTION

It is, therefore, an object of the present invention to provide a method for fanning the sheets of each set of multi-ply sheets with ease and accuracy.

Another object of the present invention is to provide an adhesive composition for fanning the sheets of each set of multi-ply sheets, which is excellent in storability, adhesiveness, separability between particular sheets and drying speed.

As a result of extensive investigations to attain the above-described objects, it has been discovered that the above objects are achieved using an adhesive composition containing a naphthalenesulfonic acid-formaldehyde condensate. As a result of additional extensive investigations to attain the above-described objects, it has also been discovered that the above objects are achieved using an adhesive containing a naphthalenesulfonic acid-formaldehyde condensate and an emulsion of a high molecular weight material.

DETAILED DESCRIPTION OF THE INVENTION

In the present invention, "fanning" designates that each set of multi-ply sheets is selectively adhered when the multi-ply sheets are separated after an adhesive is applied to the cut side of multi-ply sheets (i.e., the end of the superposed sheets). This fanning method will be explained below with respect to the use of pressure-sensitive copying papers as an example of multi-ply sheets. The term "pressure-sensitive copying papers" as used herein designates the combination of a sheet comprising a support having thereon a color former-containing microcapsule layer (hereinafter referred to as Paper A), a sheet comprising a support having on the surface thereof a color developer layer and on the back side a microcapsule layer as described above (hereinafter referred to as Paper B), and a sheet comprising a support having thereon a color developer layer (hereinafter referred to as Paper C), or the combination of Paper A and Paper C.

In the case of preparing sets of combinations of such pressure-sensitive copying papers, they are superposed one over the other in the order of, e.g., A-C, A-C, A-C, . . . ; A-B-B . . . - B-C, A-B-B . . . -B-C, A-B-B . . . -B-C; or the like, followed by cutting the resulting assemblies. When a specific adhesive composition is applied to the cut side and dried, adhesion occurs selectively only between A-C or A-B-B . . . -B-C and does not occur between C-A. The adhesion strength between A-C or A-B-B . . . -B-C, must be such that they do not separate from each other upon simple handling. Also, it is the most preferred that no adhesion occurs between C-A, this being represented to be good separability. As is described above, when the adhesive composition is applied to pressure-sensitive copying papers, sets of pressure-sensitive copying papers can easily be fanned or classified, each set comprising a definite number of papers necessary for copying.

The adhesive composition in one embodiment of this invention includes the naphthalenesulfonate-formaldehyde condensate and in another embodiment of this invention includes the naphthalenesulfonate-formaldehyde condensate and an emulsion of a high molecular weight material.

The naphthalenesulfonic acid-formaldehyde condensates (or naphthalenesulfonate-formaldehyde condensates) employed in the present invention are preferably those represented by the following general formula;

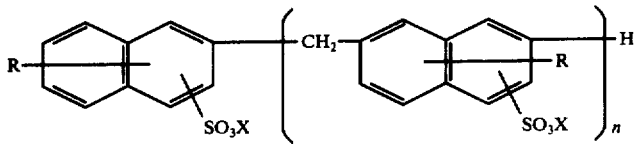

wherein the R's, which may be the same or different, each represents a hydrogen atom or an alkyl group (a plurality of R's can be present in the ring); X represents a hydrogen atom, an alkali metal atom (e.g., sodium or potassium) or an ammonium group; and $n$ represents an integer.

Of the condensates represented by the above general formula, those in which the alkyl group has 1 to 18 carbon atoms, X represents a sodium or potassium atom or an ammonium group, and $n$ represents 1 to 13 can be used with ease and are therefore preferred. Suitable examples of alkyl groups for R include methyl, ethyl, propyl, n-butyl, tert-butyl, pentyl, hexyl, heptyl, octyl, nonyl, decyl, undecyl, dodecyl, tridecyl, tetradecyl, pentadecyl, hexadecyl, heptadecyl, octadecyl, etc. In particular, those condensates in which the substituent R represents a hydrogen atom or an alkyl group having 1 to 4 (in particular, 1 to 3) carbon atoms, X represents a sodium or potassium atom and $n$ represents an integer of 1 to 5 (in particular, 2 to 5) are especially preferred. The various compounds represented by the above general formula are known as typical anionic surface active agents and are readily available.

The polymerization degree and the substituent of the naphthalenesulfonic acid-formaldehyde condensate represented by the above-illustrated general formula can influence the effect of the present invention. Therefore, in some cases, a mixture of condensates having different polymerization degrees and/or different substituents are useful.

In the first embodiment of the composition of the present invention, the naphthalenesulfonic acid-formaldehyde condensate is preferably present in the composition in a proportion of about 5 to 40% by weight, particularly 10 to 30% by weight. A most typical example of the composition comprises an aqueous solution of the aforesaid condensate at a concentration of about 5 to 40% by weight.

The emulsion of the high molecular weight material, which is a component of the second embodiment of the adhesive composition of the present invention, is a liquid in which a water-insoluble or slightly soluble high molecular weight material is emulsified in water. Such an emulsion is formed by a high molecular weight material capable of forming a film upon being dried, and it includes the so-called latexes as well. To define the emulsion of the high molecular weight material as used in the present invention in terms of physical properties, the emulsion contains about 10 to 70 wt% solids and has a viscosity of about 0.5 to 1000 poise, with the high molecular weight material having a particle size of about 0.1 to 5 μ.

As the process for the production of the emulsion of the high molecular weight material, a process comprising emulsion polymerization and a process comprising emulsifying and dispersing a solution of the high molecular weight material can be employed. Emulsions obtained by either process are included in the present invention. Such processes for the production of emulsions are described in detail in, e.g., Muroi, *Chemistry of High Molecular Latexes* (published by Kobunshi Kankokai), Sakakibara et al, *Synthetic Rubber Handbook* (published by Asakura Shoten), Philip Sherman, *Emulsion Science* (published by Academic Press Inc., London), etc.

These high molecular weight materials can be selected almost regardless of molecular weight.

Examples of latexes obtained by emulsion polymerization are styrene-butadiene rubber latexes (for example, those which contain about 25 to 75 parts by weight, preferably 65 to 40 parts by weight, of styrene and about 75 to 25 parts by weight, preferably 35 to 60 parts by weight, of butadiene and, more preferably, contains 1 to 6 parts by weight of acrylic acid, an acylic acid ester, methacrylic acid or a methacrylic acid ester), butadiene-acrylonitrile rubber latexes (containing, e.g., about 75 to 60 parts by weight of butadiene and about 25 to 40 parts by weight of acrylonitrile), chloroprene rubber latexes, vinyl acetate latexes (e.g., polyvinyl acetate, copolymers of vinyl acetate and acrylic or methacrylic acid and the esters thereof (e.g., methyl acrylate, ethyl acrylate, methyl methacrylate, etc.), particularly preferably, vinyl acetate-acrylic ester copolymers), acrylic latexes (e.g., acrylic ester copolymers such as methyl methacrylate-ethyl acrylate copolymers, methyl acrylate-ethyl acrylate copolymers, methyl methacrylate-butylacrylte copolymers, methyl acrylate-ethyl acrylate-butyl acrylate copolymers, etc., and unsaturated monomer-acrylic ester copolymers such as styrene-acrylic ester copolymers, butadiene-acrylic ester copolymers, styrene-methacrylic ester copolymers, butadiene-methacrylic ester copolymers, etc.; particularly preferably, styrene-acrylic ester copolymers or butadiene-acrylic ester copolymers with a proportion of about 10 to 80 parts by weight, preferably 40 to 60 parts by weight, of styrene and about 90 to 20 parts by weight, preferably 60 to 40 parts by weight, of an acrylic ester, or 25 to 50 parts by weight, preferably 30 to 50 parts by weight, of butadiene and about 75 to 50 parts by weight, preferably 70 to 50 parts by weight, of an acrylic ester), vinyl chloride latexes, and the like. Examples of emulsions obtained by dissolving a high molecular weight material in a solvent and emulsifying and dispersing the solution in water are polybutadiene emulsions, polyisoprene emulsions, butyl rubber emulsions, etc. Particularly useful emulsions of high molecular weight materials in the present invention are styrene-butadiene latexes and acrylic latexes. Latexes containing carboxyl or ester groups are particularly preferred.

In this second embodiment of the composition of the present invention, the naphthalenesulfonic acid-formaldehyde condensate is present in a proportion of about 5 to 30% by weight, particularly 7 to 25% by weight, and the emulsion of the high molecular weight material is present in a proportion of about 2 to 20% by weight, particularly 3 to 15% by weight, on a solids basis.

The adhesive composition can contain, if desired, a water-soluble binder. Heretofore, the use of the binder for an adhesive composition for fanning has generally involved a disadvantage in that poor separability results and adhesion requires a long period of time to complete, though the adhesion strength is great. However, in the present invention, a composition having excellent separability and adhesiveness can be obtained by the combined use with the above-described binders. Thus, the applicable range is widened.

Examples of these water-soluble binders include, for example, natural high polymers such as proteins (e.g., gelatin, gum arabic, albumin, casein, etc.), celluloses (e.g., carboxymethyl cellulose, hydroxyethyl cellulose, etc.), saccharides (e.g., agar-agar, sodium alginate, starch, carboxymethyl starch, etc.) and synthetic high molecular weight compounds such as polyvinyl alcohol, polyvinyl pyrrolidone, acrylic acid polymers (e.g., polyacrylic acid, polyacrylamide, acrylic acid-acrylamide polymer, etc.), and the like.

These water-soluble binders are used for forming a film. Those which have adhesive properties and possess the function that the adhesive selectively permeates between the sheets are more preferred. Carboxymethyl cellulose, polyvinyl alcohol, etc., are examples of such binders.

Where the adhesive composition contains a water-soluble binder, the binder can be present in a proportion of about 0.1 to 100% by weight, in particular 0.5 to 50% by weight, based on the weight of the naphthalenesulfonic acid-formaldehyde condensate. Also, when the emulsions of the high molecular weight material and the naphthalenesulfonic acid-formaldehyde condensate are present together, the water-soluble binder can be employed in a proportion of about 1 to 20 wt%, particularly 2 to 10 wt%, based on the naphthalenesulfonic acid-formaldehyde condensate and the solid components of the emulsion.

The composition of the present invention can contain, if desired, cationic, anionic or nonionic surface active agents such as trimethyloctadecylammonium chloride, sodium oleate, polyoxyethylene alkylaryl ethers, sodium ligninsulfonate, etc. The surface active agent can be present in a proportion of about 0.1 to 5% by weight based on the weight of the naphthalenesulfonic acid-formaldehyde condensate or the weight of the naphthalenesulfonic acid-formaldehyde condensate and the solid components of the emulsion.

Microcapsules to be used for pressure-sensitive copying papers can be easily produced according to already well-known methods. That is, since the density of a color former is easily controlled in the production of microcapsules at the stage of dissolving the color former, the production of the microcapsules does not limit the present invention in any way.

Microencapsulation can be effected using a coacervation method (as described in U.S. Pat. Nos. 2,800,457; 2,800,458; 3,041,298; 3,687,865; etc.), an interfacial polymerization method (as described in U.S. Pat. Nos. 3,492,380; 3,577,515; British Pat. Nos. 950,443; 1,046,409; 1,091,141; etc.), an internal polymerization method (as described in British Pat. No. 1,237,498; French Pat. Nos. 2,060,818; 2,090,862; etc.), an external polymerization method (as described in British Pat. No. 989,264; Japanese Patent Publication Nos. 12380/62; 14327/62; 29483/70; 7313/71; 30282/71; etc.), and the like.

Solvents which can be used for dissolving the color former are not limited at all in the present invention and any of those thus far known can be used. Examples thereof include, for example, aromatic synthetic oils (e.g., alkylated naphthalene, alkylated biphenyl, hydrogenated terphenyl, alkylated diphenylmethane (in which the alkyl moiety thereof has about 1 to 5 carbon atoms and the number of alkyl groups is 1 to 4), etc.), petroleum fractions (e.g., kerosene, naphtha, paraffin oil, etc.), aliphatic synthetic oils (e.g., chlorinated paraffin, etc.), vegetable oils (e.g., cotton seed oil, soybean oil, linseed oil, etc.), and a mixture thereof. The concentration of the color former solution is not particularly limited. Those skilled in the art can easily produce microcapsules utilizing the concentration of the color former solution conventionally employed for pressure-sensitive copying papers (about 1 to 10%).

The color former which can be used in the present invention is a substantially colorless compound capable of forming a color when contacted with a solid acid, and can be also defined as a colorless electron donating organic compound. The kind and the properties of the color former do not substantially influence the adhesive composition of the present invention and thus a broad range of color formers can be employed. Typical examples of color formers include, e.g., triarylmethane compounds, diarylmethane compounds, xanthene compounds, thiazine compounds, spiropyran compounds, etc.

Specific color former compounds are illustrated below.

Suitable examples of triphenylmethane compounds are 3,3-bis(p-dimethylaminophenyl)-6-dimethylaminophthalide, i.e., crystal violet lactone, 3,3-bis(p-dimethylaminophenyl)phthalide, 3-(p-dimethylaminophenyl)-3-(1,2-dimethylindol-3-yl)phthalide, 3-)p-dimethylaminophenyl)-3-(2-methylindol-3-yl)phthalide, 3-)p-dimethylaminophenyl)-3-(2-phenylindol-3-yl)phthalide, 3,3-bis-(1,2-dimethylindol-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide, 3-p-dimethylaminophenyl-3-(1-methylpyrrol-2-yl)-6-dimethylaminophthalide, etc.

Examples of diphenylmethane compounds are 4,4'-bis-dimethylaminobenzhydrin benzyl ether, N-halophenylleucoauramine, N-2,4,5-trichlorophenylleucoauramine, etc.

Typical examples of xanthene compounds are rhodamine-B-anilinolactam, rhodamine-(p-nitroanilino)lactam, rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, etc.

Suitable examples of thiazine compounds are benzoylleucomethylene blue, p-nitrobenzylleucomethylene blue, etc.

Illustrative examples of spiro compounds are 3-methyl-spiro-dinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran, 3-propyl-spiro-dibenzodipyran, etc.

The above-illustrated color formers can be appropriately selected and used individually or in combination.

Thus, a microcapsule-containing solution can be obtained. The microcapsules are desirably a mononuclear type. However, multi-nuclear type microcapsules can also be sufficiently used to attain the objects of the present invention. The size of the microcapsules is usually about 1 to 500 $\mu$, preferably about 2 to 50 $\mu$. Microcapsules of about the same size can be used in the present invention.

Thus, the adhesive composition of the invention is much superior to conventional fanning adhesives and can find wider applications.

Microcapsule coating solution is usually prepared as a microcapsule dispersion, and hence the dispersion can be coated on a support as such. Also, the dispersion can be coated, with or without separating the microcapsules from the microcapsule dispersion, by adding a binder such as a latex (e.g., styrene-butadiene rubber latex, etc.), water-soluble high polymer substance (e.g., starch, carboxymethyl cellulose, polyvinyl alcohol, gum arabic, casein, geltin, etc.), or the like. Furthermore, to the microcapsule coating solution or to the microcapsule layer can be added a microcapsule-reinforcing agent such as a cellulose fine powder (as disclosed in U.S. Pat. No. 2,711,375), polymer fine powder (as disclosed in U.S. Pat. No. 3,625,736), starch fine powder (as disclosed in British Pat. No. 1,232,347), color former-free microcapsules (as disclosed in British Pat. No. 1,235,991), etc. The microcapsule-reinforcing agent is preferably present not as a layer but scattered in the microcapsule layer or on the surface thereof.

Suitable supports include a paper, a plastic film, a resin-coated paper, a synthetic paper, and the like. The microcapsule layer is coated on at least on surface of the support, on or under a developer layer (described hereinafter) or on the support surface opposite to the developer layer.

In this specification, a color developer designates a solid acid and, more specifically, an electron accepting solid acid. Suitable color developers are described in the aforesaid preceding patents. Illustrative specific examples are clays such as acid clay, active clay, attapulgite, etc.; organic acids such as aromatic carboxy compounds (e.g., salicylic acid, etc.), organic hidroxy compounds (e.g., p-t-butylphenol, p-t-amylphenol, o-chlorophenol, m-chlorophenol, p-chlorophenol, a metal salt thereof (e.g., zinc salt, etc.), etc.); a mixture of an organic acid and a metal compound (e.g., zinc oxide, etc.), acidic polymers such as phenol-formaldehyde resins, phenol-acetylene resins, etc. Descriptions of color developers are given also in U.S. Pat. Nos. 3,501,331; 3,669,711; 3,427,180; 3,455,721; 3,516,845; 3,634,121; 3,672,935; 3,732,120; Japanese Pat. Application Nos. 48545/70; 49339/70; 83651/70; 84539/70; 93245/70; 93246/70; 93247/70; 94874/70; 109872/70; 112038/70; 112039/70; 112040/70; 112753/70; 112754/70; 118978/70; 118979/70; 86950/71; etc.

The color developer can be coated on a support together with a binder. Suitable supports can be those described before for the color former layer. Illustrative binders are, e.g., latexes such as styrene-butadiene rubber latex, styrene-butadiene-acrylonitrile latex, styrene-maleic anhydride copolymer latex, etc.; water-soluble natural high molecular weight compounds such as proteins (e.g., gelatin, gum arabic, albumin, casein, etc.), celluloses (e.g., carboxymethyl cellulose, hydroxyethyl cellulose, etc.), saccharides (e.g., agar-agar, sodium alginate, starch, carboxymethyl starch, etc.); water-soluble synthetic high polymer compounds such as polyvinyl alcohol, polyvinyl pyrrolidone, polyacrylic acid, polyacrylamide, etc.; organic solvent-soluble high molecular weight compounds such as nitrocellulose, ethyl cellulose, polyester, polyvinyl acetate, polyvinylidene chloride, vinyl chloride-vinylidene chloride copolymer, etc. These binders can be used also as a binder for the microcapsule dispersion. Additives heretofore known can also be incorporated in the color developer layer, if desired.

The naphthalenesulfonic acid-formaldehyde condensate can be said to be the best component in that not only it does not possess the disadvantages encountered with gelatins but it renders the adhesive composition separable as well. Therefore, the adhesive composition of the present invention possesses sufficient separability to fan each set of multi-ply sheets. Furthermore, the adhesive composition of the present invention can selectively penetrate between sheets and, upon penetration, the composition suitably wets the sheets.

However, if the adhesion strength of the naphthalenesulfonic acid-formaldehyde condensate alone is still insufficient and since the separability of the emulsion of the high molecular weight material alone is not good although the adhesion strength thereof is quite high, in contrast, a mixture of the naphthalenesulfonic acid-formaldehyde condensate and the emulsion of the high molecular weight material provides an adhesive composition excellent in adhesion strength and separability as compared with gelatin and the derivative thereof, latexes, naphthalenesulfonic acid-formaldehyde condensate alone and the high molecular substance emulsion alone. Thus, the adhesive composition of the present invention is much more excellent than the conventional adhesives and can find wider applications.

The present invention will now be illustrated in greater detail by reference to the following examples. Papers A, B and C used in the present invention were prepared as follows to confirm the effect of the present invention. In the Examples, all parts are by weight unless otherwise indicated.

PREPARATION OF PAPER $A_1$ 6 parts of acid-processed gelatin having an isoelectric point of 8.2 and 4 parts of gum arabic were dissolved in 40 parts of warm water at 40° C, and 0.2 part of Turkey red oil was added as an emulsifier (colloid solution). Then, 45 parts of diisopropylnaphthalene containing dissolved therein 30% by weight of crystal violet lactone and 2.5% by weight of benzoyl leucomethylene blue (color former oil) was added to the above-described colloid solution under vigorous stirring for emulsification to form an o/w type emulsion. The stirring was discontinued when the size of oil droplets became $8 \sim 12\ \mu$. 185 parts of warm water at 40° C was added thereto. An aqueous solution of 20% hydrochloric acid was added dropwise thereto, while continuing the stirring, to adjust the pH to 4.4. The colloid wall accumulated around the oil droplets was gelled and solidified by cooling from the outside of the vessel while continuing the stirring. 1.5 parts of a 37% formaldehyde aqueous solution was added under stirring when the liquid temperature reached 10° C.

Further, 20 parts of an aqueous solution (7% by weight) of the sodium salt of carboxymethyl cellulose (etherification degree: 0.75) was added thereto. Then, a 10% by weight sodium hydroxide aqueous solution was added dropwise thereto until the pH of the system reached 10, and the temperature of the system was increased externally and maintained for 1 hour at 40° C to obtain a color former-containing Microcapsule Solution A. To the thus obtained Microcapsule Solution A were added 5 parts of cellulose powder, 3 parts of wheat starch particles classified to a particle size $15 \sim 25\ \mu$ and 80 parts of a 10% oxidized starch solution to prepare a microcapsule dispersion. This was coated on a 40 g/m² paper in an amount of 5.5 g (on a solid basis)/m² using air knife-coating, followed by drying, to obtain coated Paper $A_1$ for testing.

PREPARATION OF PAPERS $C_1$ AND $B_1$ 100 parts of sulfuric acid-processed clay was dispersed in 280 parts of water containing 6 parts of a 40% sodium hydroxide solution using a homogenizer. Then, 50 parts of a 10% aqueous solution of sodium caseinate and 30 parts of styrene-butadiene rubber latex were added thereto, and the resulting mixture was coated on a 40 g/m² paper in an amount (on a solid basis) of 8 g/m² using an air knife-coating method, followed by drying. Then, the resulting coated paper was subjected to calendering to obtain coated Paper $C_1$ for testing.

Also, coated Paper $B_1$ for testing was obtained by coating the above-described microcapsule dispersion on the opposite side of the Paper $C_1$ to the coated side in an amount of 6 g/m² (on a solid basis) using an air knife-coating method, followed by drying.

TESTING METHOD

Papers $A_1$, $B_1$ and $C_1$ were superposed in the order of $A_1$-$B_1$-$B_1$-$C_1$ to prepare 50 combinations thereof, which were then cut into 3 cm × 5 cm pieces. Then, the adhesive was applied to the cut side in an amount of 5 g/100 cm², followed by drying at room temperature (about $20 \sim 30°$ C).

The adhesion strength and separability were examined 1 hour after drying using the following methods.

[Measurement of Adhesion Strength]

The adhesive composition was applied to the samples in the transverse direction. Adhesion strength of each sample was measured using a tensile testing machine (trade name: Strograph M-type; made by Toyo Seiki Seisakusho). The measuring conditions were as follows.

| Load: | 1 kg |
| Pulling Speed: | 150 mm/min |
| Load Detector: | U gauge-type load converter |
| Recorder: | 200 mm/min in feeding speed |

[Separability]

Separability was rated as follows: no adhesion between $C_1$-$A_1$: 100; easily separable although adhering slightly: 80; adhering and difficulty separable: 60; completely adhering and non-separable (i.e., impossible to separate between $C_1$-$A_1$): 0.

EXAMPLE 1

Each of the following sodium naphthalenesulfonate-formaldehyde condensates shown below;

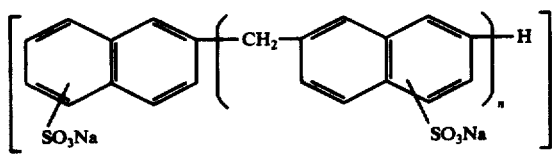

was dissolved in water to prepare a 30% solution, which solutions were then used as an adhesive composition. The adhesive strength between $A_1$-$B_1$, $B_1$-$B_1$ and $B_1$-$C_1$ were measured to obtain the results shown in Table 1.

TABLE 1

| Evaluation | Adhesive 1 (n = 3 ~ 4) | Adhesive 2 (n = 5 ~ 6) | Adhesive 3 (n = 9 ~ 11) |
|---|---|---|---|
| Adhesion Strength | | | |
| Between $A_1$-$B_1$ | 45 | 58 | 65 |
| Between $B_1$-$B_1$ | 65 | 88 | 72 |
| Between $B_1$-$C_1$ | 83 | 110 | 81 |
| Separability | 100 | 100 | 100 |

EXAMPLE 2

26 parts of a sodium naphthalenesulfonate-formaldehyde condensate ($n = 4 \sim 5$), 3 parts of shellac and 0.5 part of monoethanolamine were dissolved in 71.5 parts of water to prepare an adhesive composition.

EXAMPLE 3

15 parts of the same condensate as used in Example 2 and 3 parts of the sodium salt of carboxymethyl cellulose were dissolved in 82 parts of water to obtain an adhesive composition.

EXAMPLE 4

15 parts of sodium methylnaphthalenesulfonate-formaldehyde condensate as described in Example 2 and 3 parts of polyvinyl alcohol (saponification degree: 88%; mean polymerization degree: 500) were dissolved in 90 parts of warm water (65° C) and cooled to room temperature. Thus, an adhesive composition was obtained.

The results obtained using the adhesive composition in Examples 2 to 4 are shown in Table 2.

TABLE 2

| | Adhesion Strength | | | |
|---|---|---|---|---|
| Example | Between $A_1$-$B_1$ | Between $B_1$-$B_1$ | Between $B_1$-$C_1$ | Separability |
| 2 | 90 | 127 | 84 | 100 |
| 3 | 213 | 324 | 190 | 100 |
| 4 | 177 | 228 | 152 | 100 |

As is clear from the results in Table 2, the naphthalenesulfonic acid-formaldehyde condensate was excellent as an adhesive for fanning each set of sheets. In particular, it is clear that the compound possesses suitable separability properties.

The effects of the present invention were further confirmed using the following Papers $A_2$, $B_2$ and $C_2$.

PREPARATION OF PAPER $A_2$ 10 parts of acid-processed pig-skin gelatin and 10 parts of gum arabic were dissolved in 400 parts of warm water at 40° C. and 0.2 part of Turkey red oil was added thereto as an emulsifier. Then, 40 parts of a color former oil was emulsified and dispersed therein, the color former oil having been prepared by dissolving 2% crystal violet lactone in an oil comprising 4 parts of isopropylnaphthalene and 1 part of lamp oil. The emulsification was discontinued when the size of oil droplets became 5 $\mu$ on an average. To this was added water at 40° C to make the total 900 parts, followed by continuing the stirring. At this occasion, care was taken so that the solution temperature did not become less than 40° C. Then, 10% acetic acid was added thereto to adjust the pH of the solution to 4.0 ~ 4.2, with coacervation occurring. Stirring was further continued and, after 20 minutes, the solution was cooled externally with ice water to gel the coacervate film deposited around the oil droplets. When the solution temperature reached 20° C, 7 parts of a 37% formaldehyde aqueous solution was added thereto. At 10° C, 40 parts of a 7% aqueous solution of the sodium salt of carboxymethylcellulose was added, followed by adding dropwise thereto a 15% sodium hydroxide aqueous solution to adjust the pH to 9. At this point, the addition of the sodium hydroxide was conducted with utmost care. Then, the system was heated for 20 minutes to increase the solution temperature to 50° C under stirring. After the temperature was adjusted to 30° C, the thus prepared microcapsules were coated on a 40 g/m² paper in an amount of 6 g (on a solid basis)/m², followed by drying.

With other color formers, samples were prepared in the same manner as described above.

PREPARATION OF PAPER $B_2$ 6 parts of a 20% sodium hydroxide aqueous solution was added to 150 parts of water. Then, 50 parts of active clay was gradually added thereto. After stirring for 30 minutes, 20 parts of styrene-butadiene latex (solids content: 48% by weight; pH: 8.5; viscosity: 250 cp; means grain size: 0.16 $\mu$) was added and uniformly mixed. This coating solution was coated on a 40 g/m² paper in an amount of 8 g/m² (on a solid basis), and dried, followed by calendering. Then, the same microcapsule coating solution as used in the preparation of Paper $A_2$ was coated on the opposite side of the support in an amount of 6 g/m² (on a solid basis), followed by drying.

PREPARATION OF PAPER $C_2$

The same color developer (active clay) solution as used in the preparation of Paper $B_2$ was coated on a 110 g/m² paper in an amount of 8 g/m² (on a solid basis) and dried, followed by calendering.

TESTING METHOD

The thus obtained papers $A_2$, $B_2$ and $C_2$ were superposed in the order of $A_2$-$B_2$-$B_2$-$B_2$-$C_2$ to accumulate 50 units thereof, which were then cut into 3 cm × 5 cm pieces. Then, adhesive composition was applied to one cut side in an amount of 5g/100cm², followed by drying at room temperature.

Adhesion strength and separability were examined 1 hour after drying in accordance with the previously described methods.

EXAMPLE 5

A sodium naphthalenesulfonate-formaldehyde condensate;

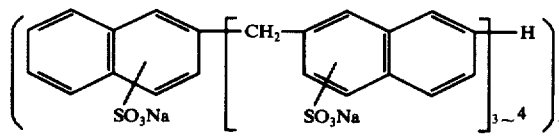

was dissolved in water at 50° C. Then, a modified styrene-butadiene copolymer latex (solids content: 49% by weight; pH: 6.8; viscosity: 95 cp (25° C); particle size: $0.1 \sim 0.15\,\mu$) was added thereto to prepare an adhesive composition. The ratio of the condensate to the latex and the concentration of the solids in the composition were changed as shown in the following Tble 3 to measure the adhesion strength between $A_2$-$B_2$, $B_2$-$B_2$ and $B_2$-$C_2$, and separability between $C_2$-$A_2$. The results thus obtained are given in Table 3.

TABLE 3

| Concentration of Solids | Property | Amount of Latex (by weight) Based on 1 Part by Weight of the Condensate | | | |
|---|---|---|---|---|---|
| | | 0.5 | 1.25 | 2.0 | 2.5 |
| 10% | Adhesion Strength Between: | | | | |
| | $A_2$-$B_2$ | 97 | 120 | 330 | 313 |
| | $B_2$-$B_2$ | 115 | 253 | 453 | 400 |
| | $B_2$-$C_2$ | 120 | 293 | 583 | 447 |
| | Separability: | 100 | 100 | 100 | 100 |
| 15% | Adhesion Strength Between: | | | | |
| | $A_2$-$B_2$ | 153 | 367 | 297 | 390 |
| | $B_2$-$B_2$ | 240 | 373 | 410 | 477 |
| | $B_2$-$C_2$ | 257 | 470 | 447 | 483 |
| | Separability: | 100 | 100 | 100 | 100 |
| 20% | Adhesion Strength Between: | | | | |
| | $A_2$-$B_2$ | 82 | 432 | 417 | 407 |
| | $B_2$-$B_2$ | 90 | 537 | 540 | 547 |
| | $B_2$-$C_2$ | 83 | 433 | 367 | 330 |
| | Separability: | 100 | 100 | 100 | 100 |

EXAMPLE 6

The same sodium naphthalenesulfonate-formaldehyde condensate as in Example 5 was dissolved in water at 50° C (in the following concentration) to prepare adhesive compositions. The results obtained are given in Table 4.

TABLE 4

| Adhesion Strength Between: | Concentration of Condensate | | | |
|---|---|---|---|---|
| | 8 wt % | 12 wt % | 16 wt % | 20 wt % |
| $A_2$-$B_2$ | 2 | 5 | 10 | 21 |
| $B_2$-$B_2$ | 3 | 5 | 10 | 22 |
| $B_2$-$C_2$ | 2 | 5 | 9 | 19 |
| Separability | 100 | 100 | 100 | 100 |

COMPARATIVE EXAMPLE 1

To the same latex as in Example 5 was added water to prepare adhesive compositions having the following latex concentrations. The results obtained are given in Table 5.

TABLE 5

| Adhesion Strength Between: | Concentration of Latex | | | |
|---|---|---|---|---|
| | 2 wt % | 6 wt % | 10 wt % | 14 wt % |
| $A_2$-$B_2$ | 98 | 217 | 266 | 287 |
| $B_2$-$B_2$ | 90 | 260 | 313 | 325 |
| $B_2$-$C_2$ | 69 | 280 | 327 | 332 |
| Separability | 60 | 0 | 0 | 0 |

As is clear from the results in Tables 3 ~ 5, the adhesive composition of this embodiment of the present invention comprising the naphthalenesulfonic acid-formaldehyde condensate and the latex was improved both in the adhesive strength and the separability (the degree thereof being clearly that of a synergistic effect), while the independent use of the naphthalenesulfonic acid-formaldehyde condensate provided poorer adhesive strength although separability was good and the independent use of the latex provided very bad separability.

EXAMPLE 7

Adhesive compositions were prepared in the same manner as in Example 5 except for using a modified methyl methacrylate-ethyl acrylate copolymer latex (solids content: 45% by weight; pH: 3.0; viscosity: 600 cp; means particle size: 0.1 ~ 0.15) as the latex. The results obtained are given in Table 6.

TABLE 6

| Concentration | | Amount of Latex (by weight) Based on 1 Part of the Condensate | | | |
|---|---|---|---|---|---|
| | | 0.5 | 1.25 | 2.0 | 2.5 |
| 10% | Adhesion Strength Between: | | | | |
| | $A_2$-$B_2$ | 183 | 290 | 385 | 420 |
| | $B_2$-$B_2$ | 177 | 275 | 380 | 427 |
| | $B_2$-$C_2$ | 125 | 188 | 260 | 280 |
| | Separability | 100 | 100 | 100 | 100 |
| 15% | Adhesion Strength Between: | | | | |
| | $A_2$-$B_2$ | 270 | 273 | 477 | 423 |
| | $B_2$-$B_2$ | 253 | 360 | 340 | 377 |
| | $B_2$-$C_2$ | 182 | 273 | 280 | 280 |
| | Separability | 100 | 100 | 100 | 100 |
| 20% | Adhesion Strength Between: | | | | |
| | $A_2$-$B_2$ | 272 | 378 | 397 | 293 |
| | $B_2$-$B_2$ | 257 | 278 | 303 | 253 |
| | $B_2$-$C_2$ | 203 | 213 | 248 | 192 |
| | Separability | 100 | 100 | 80 | 80 |

COMPARATIVE EXAMPLE 2

To the same modified methyl methacrylate-ethyl acrylate copolymer latex as in Example 7 was added water to prepare adhesive compositions having the following concentrations. The results obtained are shown in Table 7.

TABLE 7

| Adhesion Strength Between: | Concentration of Latex | | | |
|---|---|---|---|---|
| | 2 wt % | 6 wt % | 10 wt % | 14 wt % |
| A - B | 53 | 152 | 237 | 273 |
| B - B | 48 | 144 | 240 | 268 |
| B - C | 41 | 120 | 202 | 270 |
| Separability | Not more than 60 | 0 | 0 | 0 |

Comparison of the results shown in Tables 5, 3 and 6 reveals that the independent use of the latex provided poor separability although the adhesion strength was quite high and is therefore impractical as an adhesive composition for fanning multi-ply sheets. In contrast, it is seen that mixture of the sodium naphthalenesulfonate-formaldehyde condensate and the emulsion of the high molecular weight material (latex) was effective as an adhesive composition for fanning multi-ply sheets.

EXAMPLE 8

Sodium naphthalenesulfonate-formaldehyde condensate as described in Example 5 ($n = 4 \sim 5$) was dissolved in warm water. Then, styrene-acrylic ester emulsion (solids concentration: 30% by weight; pH: 7; mean particle size: 0.2 μ; viscosity: 50 cp (25° C)) was added thereto to prepare adhesive compositions. The ratio of the sodium naphthalenesulfonate-formaldehyde condensate to the styrene-acrylic ester emulsion was 1:2 and the concentration was 20% by weight.

EXAMPLE 9

Sodium naphthalenesulfonate-formaldehyde condensate as described in Example 8 was dissolved in warm water at 50° C at 12.5 wt % to prepare an adhesive composition.

COMPARATIVE EXAMPLE 3

A styrene-acrylic ester emulsion (solids concentration: 30 wt %) was diluted to a concentration of 7.5% to prepare an adhesive composition.

EXAMPLE 10

10 parts of the same condensate as in Example 2 was dissolved in 80 parts of water, and then 10 parts of a modified styrene-butadiene copolymer latex (solids content: 49%) was added thereto, followed by mixing. Thus, an adhesive composition was obtained.

EXAMPLE 11

15 parts of a potassium naphthalenesulfonate-formaldehyde condensate mixture ($n \leq 3$: 15% by weight; $n = 4 \sim 6$: 50% by weight; $n = 6 \sim 12$: 35% by weight);

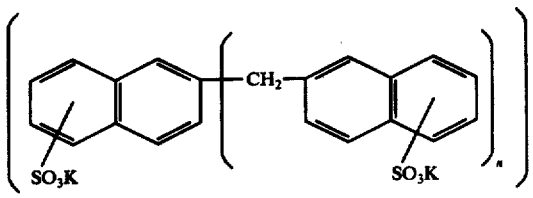

and 0.5 part of a cationic surface active agent were dissolved in 85 parts of water, and 10 parts of modified a methyl methacrylate-ethyl acrylate copolymer latex (solids content: 45%; pH: 3.0) wa added thereto for mixing. Thus, an adhesive composition was obtained.

The results of Examples 8 toll and Comparative Example 3 are shown in Table 8.

TABLE 8

| Adhesion Strength Between* | Ex. 8 | Ex. 10 | Ex. 11 | Ex. 9 | Comparative Example 3 |
|---|---|---|---|---|---|
| A - B | 356 | 386 | 290 | 6 | 190 |
| B - B | 340 | 435 | 321 | 5 | 200 |
| B - C | 297 | 363 | 263 | 5 | 160 |
| Separability | 100 | 100 | 100 | 100 | 0 |

*Papers $A_1$, $B_1$ and $C_1$ were employed in the evaluation of Examples 10 and 11 and $A_2$, $B_2$ and $C_2$ were employed in the evaluation of Examples 8 and 9, and Comparative Example 3.

A mixture of the sodium naphthalenesulfonic-formaldehyde condensate and the emulsion of the high molecular weight material is an adhesive composition quite superior in adhesion strength and separability to the independent use thereof.

While the invention has been described in detail and with reference to specific embodiments thereof, it will be apparent to one skilled in the art that various changes and modifications can be made therein without departing from the spirit and scope thereof.

What is claimed is:

1. A method for fanning units comprising multi-ply sheets, which comprises applying an adhesive composition containing a sodium salt or potassium salt of naphthalenesulfonate-formaldehyde condensate to one side of a stack of multi-ply sheets and separating each unit of said sheets, wherein said naphthalenesulfonate-formaldehyde condensate is present in said composition in a proportion of about 5 to 40% by weight.

2. The method of claim 1, wherein said adhesive composition includes additionally at least one of a water-soluble binder and a cationic, anionic or nonionic surface active agent.

3. The method of claim 1, wherein said naphthalenesulfonate-formaldehyde condensate has the general formula

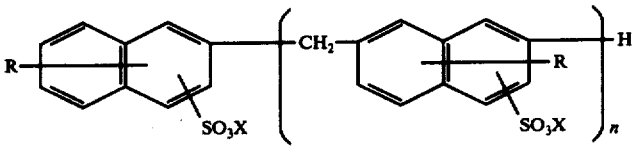

wherein the R's, which may be the same or different, each represents a hydrogen atom or an alkyl group, in which a plurality of the R's can be present on the naphthalene ring; X represents a hydrogen atom, an alkali metal atom or an ammonium group; and *n* represents an integer.

4. The method of claim 3, wherein the alkyl group of said R has 1 to 18 carbon atoms; X represents a sodium atom, a potassium atom or an ammonium group; and *n* represents 1 to 13.

5. The method of claim 4, wherein said alkyl group for said R has from 1 to 4 carbon atoms; X represents a sodium atom or a potassium atom; and *n* represents an integer of 1 to 5.

6. A method for fanning units comprising multi-ply sheets, which comprises applying an adhesive composition containing about 5 to 30% by weight on a solids base of naphthalenesulfonate-formaldehyde condensate and about 2 to 20% by weight on a solids base of an emulsion of a high molecular weight material to one side of a stack of multi-ply sheets and separating each unit of said sheets, wherein said emulsion of a high molecular weight material is a styrene-butadiene rubber latex, a butadiene-acrylonitrile rubber latex, a chloroprene rubber latex, a vinyl acetate latex, an acrylic latex, or a vinyl chloride latex.

7. The method of claim 6, wherein said adhesive composition includes at least one of a water-soluble binder and a cationic, anionic or nonionic surface active agent.

8. The method of claim 6, wherein said emulsin of a high molecular weight material contains about 10% to 70 weight % solids, has a viscosity of about 0.5 to 1000 poise and with the high molecular weight material having a particle size of about 0.1 to 5 microns.

* * * * *